(12) United States Patent
Kim et al.

(10) Patent No.: US 7,023,515 B2
(45) Date of Patent: *Apr. 4, 2006

(54) ARRAY SUBSTRATE FOR IPS MODE LIQUID CRYSTAL DISPLAY DEVICE AND METHOD FOR FABRICATING THE SAME

(75) Inventors: Ik-Soo Kim, Gunpo-si (KR); Gee-Sung Chae, Incheon-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/762,327

(22) Filed: Jan. 23, 2004

(65) Prior Publication Data

US 2004/0150779 A1 Aug. 5, 2004

Related U.S. Application Data

(63) Continuation of application No. 10/318,235, filed on Dec. 13, 2002, now Pat. No. 6,741,313.

(30) Foreign Application Priority Data

Dec. 24, 2001 (KR) ................................ 2001-84259

(51) Int. Cl.
G02F 1/1343 (2006.01)
G02F 1/136 (2006.01)

(52) U.S. Cl. ........................... 349/141; 349/39; 349/43; 349/139

(58) Field of Classification Search .................. 349/38, 349/39, 43, 139, 141
See application file for complete search history.

(56) References Cited

U.S. PATENT DOCUMENTS 5,598,285 A    1/1997 Kondo et al.
5,724,107 A *  3/1998 Nishikawa et al. ........... 349/38
5,745,207 A    4/1998 Asada et al.

(Continued)

FOREIGN PATENT DOCUMENTS

| JP | 09-005764 | 1/1997 |
|---|---|---|
| JP | 9005764 A2 | 1/1997 |
| JP | 09-073101 | 3/1997 |
| JP | 9073101 A2 | 3/1997 |
| JP | 09-101538 | 4/1997 |
| JP | 09-105908 | 4/1997 |
| JP | 9101538 A2 | 4/1997 |
| JP | 9105908 A2 | 4/1997 |

OTHER PUBLICATIONS

R. Kieler et al.; "In-Plane Switching of Nematic Liquid Crystals"; Japan Display '92; pp. 547-550.

(Continued)

*Primary Examiner*—Huyen Ngo
(74) *Attorney, Agent, or Firm*—McKenna Long & Aldridge LLP

(57) ABSTRACT

An array substrate for in-plane switching (IPS) mode liquid crystal display (LCD) device includes a pixel electrode having an extension portion, a vertical portion and a horizontal portion, the extension portion being extended from the drain electrode to the pixel region, the vertical portion being vertically extended from the extension portion and the horizontal portion being over the common line and being connected to the vertical portion. The device includes a common electrode having a plurality of vertical portions and a horizontal portion, the plurality of the vertical portions being vertically extended from the common line and arranged in an alternating pattern with the vertical portion of the pixel electrode, the horizontal portion connecting the plurality of the vertical portions into one. An auxiliary line is over the horizontal portion of the pixel electrode and being overlapped with the common line.

10 Claims, 9 Drawing Sheets

U.S. PATENT DOCUMENTS

| | | | |
|---|---|---|---|
| 5,838,037 | A | 11/1998 | Masutani et al. |
| 5,920,362 | A * | 7/1999 | Lee .............................. 349/38 |
| 5,946,060 | A | 8/1999 | Nishiki et al. |
| 5,990,987 | A | 11/1999 | Tanaka et al. |
| 6,028,653 | A | 2/2000 | Nishida et al. |
| 6,097,454 | A | 8/2000 | Zhang et al. |
| 6,741,313 | B1 * | 5/2004 | Kim et al. .................. 349/141 |
| 2002/0085134 | A1 * | 7/2002 | Chung ......................... 349/39 |
| 2002/0180901 | A1 * | 12/2002 | Kim .............................. 349/43 |

OTHER PUBLICATIONS

M. Oh-e, et al.; "Principles and Characteristics of Electro-Optical Behaviour with In-Plane Switching Mode"; Asia Display '95; pp. 577-580.

M. Ohta et al.; "Development of Super-TFT-LCDs with In-Plane Switching Display Mode"; Asia Display '95; pp. 707-710.

S. Matsumoto et al.; Display Characteristics of In-Plane Switching (IPS) LCDs and a Wide-Viewing-Angle 14.5-in. OPS TFT-LCD; Euro Display '96; pp. 445-448.

H. Wakemoto et al.; "An Advanced In-Plane Switching Mode TFT-LCD"; SID 97 Digest; pp. 929-932.

S.H. Lee et al.; High-Transmittance, Wide-Viewing-Angle Nematic Liquid Crystal Display Controlled by Fringe-Field Switching; Asia Display '98; pp. 371-374.

S. Endoh et al.; "Diagonal Super-TFT-LCDs with Mega Wide Viewing Angle and Fast Response Speed of 20 ms"; IDW '99; pp. 187-190.

* cited by examiner

ARRAY SUBSTRATE FOR IPS MODE LIQUID CRYSTAL DISPLAY DEVICE AND METHOD FOR FABRICATING THE SAME

This application is a continuation of prior application Ser. No. 10/318,235, filed Dec. 13, 2002 now U.S. Pat. No. 6,741,313.

This application claims the benefit of Korean Patent Application No. 2001-84259, filed on Dec. 24, 2001 in Korea, which is hereby incorporated by reference for all purposes as if fully set forth herein.

BACKGROUND OF THE INVENTION

1. Field of the Invention

The present invention relates to a liquid crystal display (LCD) device and more particularly, to an array substrate for In-Plane Switching (IPS) mode liquid crystal display device and fabricating method for the same in order to realize a minute pixel.

2. Discussion of the Related Art

A typical liquid crystal display (LCD) device uses optical anisotropy and polarization properties of liquid crystal molecules. The liquid crystal molecules have a definite orientation order in alignment resulting from their thin and long shapes. The alignment direction of the liquid crystal molecules can be controlled by supplying an electric field to the liquid crystal molecules. In other words, as the alignment direction of the electric field is changed, the alignment of the liquid crystal molecules also changes. Because incident light is refracted to the orientation of the liquid crystal molecules due to the optical anisotropy of the aligned liquid crystal molecules, image data is displayed.

Currently, active matrix LCDs, in which the thin film transistors and the pixel electrodes are arranged in the form of a matrix, are widely used because of their high resolution and superiority in displaying moving images. An array substrate for the related art in-plane switching (IPS) mode liquid crystal display (LCD) device and the fabricating method for the same will be described hereinafter.

FIG. 1 is a plan view of a pixel of an array substrate for a related art in-plane switching (IPS) mode liquid crystal display (LCD) device. As shown in the figure, a plurality of gate lines 12 and common lines 16 are horizontally formed on an array substrate 10 and they are spaced apart from each other. A plurality of data lines 24 is vertically formed on the array substrate 10 and cross the gate lines 12 and the common lines 16. The data line 24 defines a pixel "P" by crossing the gate line 12. A thin film transistor "T" is formed in a cross point of the gate line 12 and the data line 24. The thin film transistor "T" includes a gate electrode 14, an active layer 20, a source electrode 26 and a drain electrode 28. The active layer 20, the source electrode 26 and the drain electrode 28 are formed over the gate electrode 14. The gate electrode 14 communicates with the gate line 12 and the source electrode 26 communicates with the data line 24. A pixel electrode 30 that communicates with the drain electrode 28 and a common electrode 17 that is parallel with the pixel electrode 30 are formed in the pixel region "P". The common electrode 17 communicates with the common line 16. The pixel electrode 30 includes an extension portion 30a, a vertical portion 30b and a horizontal portion 30c. The extension portion 30a of the pixel electrode 30 is extended from the drain electrode 28 and the vertical portion 30b of the pixel electrode 30 is vertically extended from the extension portion 30a. The horizontal portion 30c of the pixel electrode 30 is formed over the common line 16 and connected to the vertical portion 30b. The common electrode 17 includes a horizontal portion 17a and a plurality of vertical portions 17b. The plurality of vertical portions 17b of the common electrode 17 is arranged in an alternating order with the vertical portion 30b of the pixel electrode 30. The horizontal portion 17a of the common electrode 17 connects the plurality of the vertical portion 17b into one portion. An auxiliary storage capacitor "C" is formed in the pixel region "P". The auxiliary storage capacitor "C" uses a portion of the common line 16 as a first storage electrode and the horizontal portion of the pixel electrode 30c as a second storage electrode.

FIGS. 2A to 2C are cross-sectional views taken along II—II and III—III of FIG. 1 illustrating a fabrication process according to a fabrication sequence of the related art. In FIG. 2A, the gate line 12 of FIG. 1 including the gate electrode 14, the common line 16 and the common electrode 17 are formed on the substrate 10 by depositing and patterning conductive metal material such as aluminum (Al), aluminum neodymium (AlNd), chromium (Cr), molybdenum (Mo) or tungsten (W), for example. A gate insulating layer 18 is then formed on the substrate 10 by depositing inorganic insulating material such as silicon nitride (SiNx) or silicon oxide (SiO$_2$), for example. The active layer 20 and an ohmic contact layer 22 are formed on the gate insulating layer 18 by depositing and patterning amorphous silicon (a-Si:H) and doped amorphous silicon (n+a-Si:H or p+a-Si:H).

In FIG. 2B, the data line 24, the source electrode 26, the drain electrode 28 and the pixel electrode 30 are formed on the substrate 10 by depositing and patterning conductive metal material such as aluminum (Al), aluminum neodymium (AlNd), chromium (Cr), molybdenum (Mo) or tungsten (W), for example. The data line 24 defines the pixel region "P" by crossing the gate line 12 and the common line 16. The source electrode 26 is formed by being extended from the data line 24 and partially overlapped with the active layer 20. The drain electrode 28 is spaced apart from the source electrode 26. The pixel electrode 30 comprises the extension portion 30a, the vertical portion 30b and the horizontal portion 30c. The horizontal portion 30b of the pixel electrode 30 is formed on the common line 16. The active layer 20 portion between the source electrode 26 and the drain electrode 28 is exposed by etching the ohmic contact layer 22 between the source electrode 26 and the drain electrode 28.

In FIG. 2C, a passivation layer 32 is formed on the substrate 10 by coating organic insulating material such as benzocyclobutene (BCB), for example, or by depositing inorganic insulating material such as silicon nitride (SiNx) or silicon oxide (SiO$_2$), for example.

FIG. 3 is a circuit diagram of FIG. 1. A capacitor communicates with the thin film transistor "T" in series. The capacitor includes a liquid crystal capacitor ($C_{LC}$) and a storage capacitor ($C_{ST}$), which is connected in parallel to the liquid crystal capacitor ($C_{LC}$).

However, if the pixel structure stated above for the in-plane switching (IPS) mode liquid crystal display (LCD) device that drives a minute pixel, an area for the storage capacitor "C" is limited. Moreover, if the area for the storage capacitor "C" is designed to be larger in order to secure a capacitance of the storage capacitor "C", an aperture ratio of the liquid crystal panel is decreased.

SUMMARY OF THE INVENTION

Accordingly, the present invention is directed to an array substrate for in-plane switching (IPS) mode liquid crystal display (LCD) device and method for fabricating the same that substantially obviates one or more of problems due to limitations and disadvantages of the related art.

An advantage of the present invention is to provide the array substrate for in-plane switching (IPS) mode liquid crystal display (LCD) device in order to secure enough auxiliary capacitance without enlarging an area of a storage capacitor "C".

Another advantage of the present invention is to provide a fabricating method for the array substrate for in-plane switching (IPS) mode liquid crystal display (LCD) device in order to secure enough auxiliary capacitance without enlarging an area of a storage capacitor "C".

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for in-plane switching (IPS) mode liquid crystal display (LCD) device comprises a substrate having a plurality of pixel regions, a plurality of gate lines and a plurality of common lines in a horizontal direction, the common line being spaced apart from the gate line; a plurality of data lines crossing the gate line and the common line; a thin film transistor at a cross point of the gate line and the data line, the thin film transistor having a gate electrode, an active layer, a source electrode and a drain electrode; a pixel electrode having an extension portion, a vertical portion and a horizontal portion, the extension portion being extended from the drain electrode to the pixel region, the vertical portion being vertically extended from the extension portion and the horizontal portion being over the common line and being connected to the vertical portion; a common electrode having a plurality of vertical portions and a horizontal portion, the plurality of the vertical portions being vertically extended from the common line and arranged in an alternating pattern with the vertical portion of the pixel electrode, the horizontal portion connecting the plurality of the vertical portions into one portion, and an auxiliary line over the horizontal portion of the pixel electrode and being overlapped with the common line.

The array substrate further comprises a dummy line, referred to as a common guard ring, in a non-display area of the substrate that communicates with the auxiliary line in order to apply a common voltage to the auxiliary line. The gate line, the common line and the dummy line are formed one of aluminum (Al), aluminum alloy (Al alloy), tungsten (W), molybdenum (Mo), copper (Cu) and chromium (Cr). The common line and the horizontal portion of the pixel electrode having an insulating layer therebetween forms a first auxiliary storage capacitor and the horizontal portion of the pixel electrode and the auxiliary line having an insulating layer therebetween forms a second auxiliary storage capacitor.

A fabrication method of an array substrate for in-plane switching (IPS) mode liquid crystal display (LCD) device comprises forming a plurality of gate lines, a plurality of common lines and a dummy line on an array substrate, the gate line and the common line being formed in a horizontal direction and spaced apart from each other, the dummy line being formed in a non-display area; forming a plurality of data lines crossing the gate line and the common line; forming a thin film transistor at a cross point of the gate line and the data line, the thin film transistor including a gate electrode, an active layer, a source electrode and a drain electrode; forming a pixel electrode having an extension portion, a vertical portion and a horizontal portion, the extension portion being extended from the drain electrode, the vertical portion being vertically extended from the extension portion and the horizontal portion being over the common line and connected to the vertical portion; forming a common electrode having a plurality of vertical portions and a horizontal portion, the plurality of the vertical portions being vertically extended from the common line and arranged in an alternating pattern with the vertical portion of the pixel electrode, the horizontal portion connecting the plurality of the vertical portions into one portion; and forming an auxiliary line over the horizontal portion of the pixel electrode, the auxiliary line being overlapped with the common line and one end of the auxiliary line communicating with the dummy line.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiment of the present invention, which is illustrated in the accompanying drawings.

Figure 1:
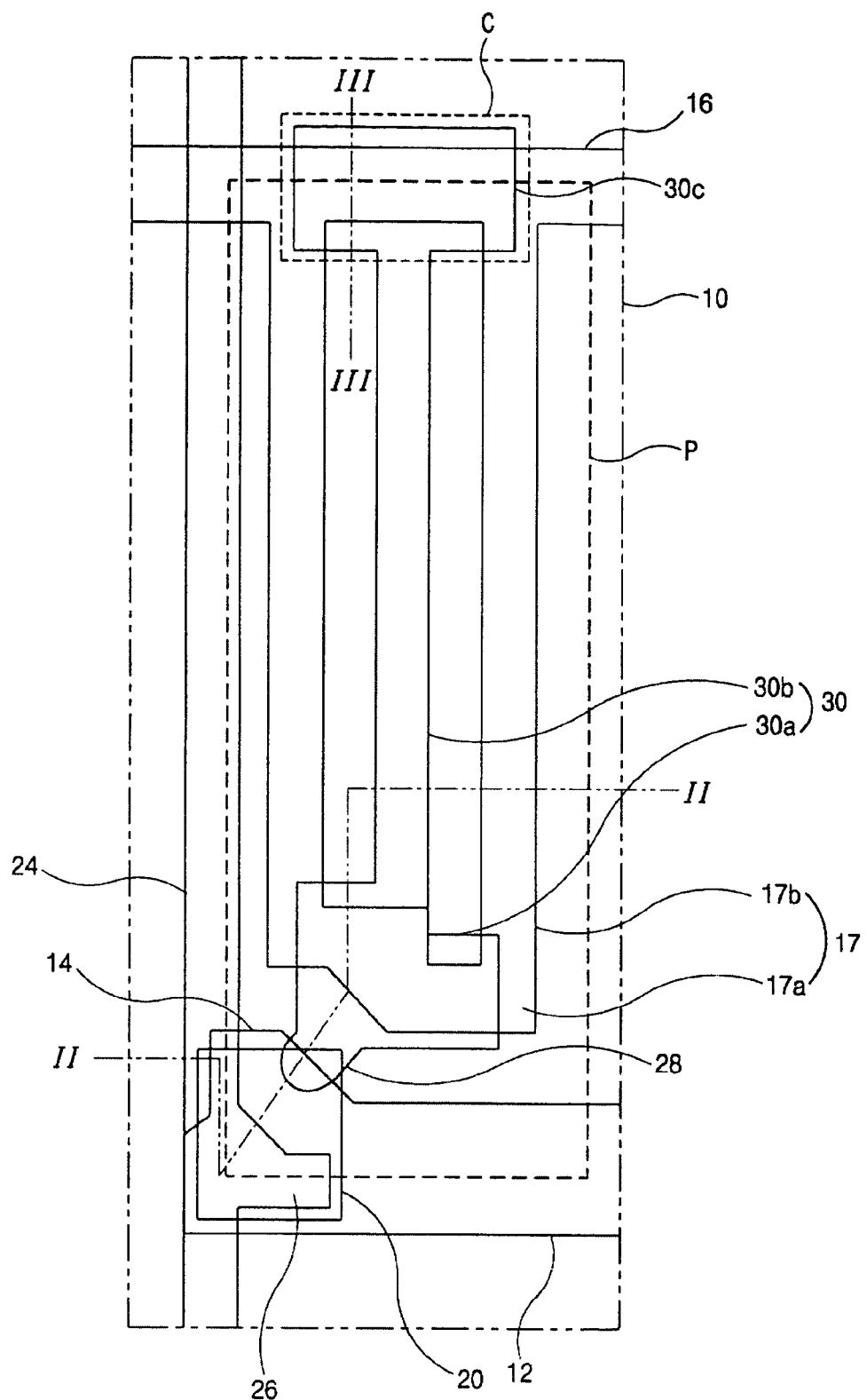
FIG. 1 is a plan view of a pixel of an array substrate for a related art in-plane switching (IPS) mode liquid crystal display (LCD) device.
Figure 2A:
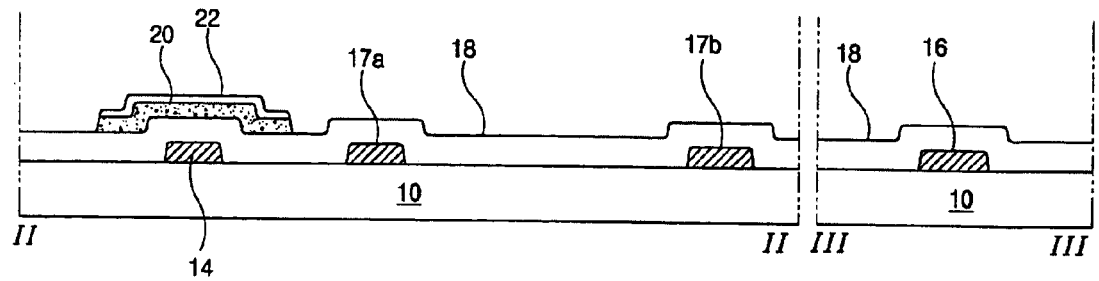
FIGS. 2A to 2C are cross-sectional views taken along II—II and III—III of FIG. 1 illustrating a fabrication process according to a fabrication sequence of the related art.
Figure 2B:
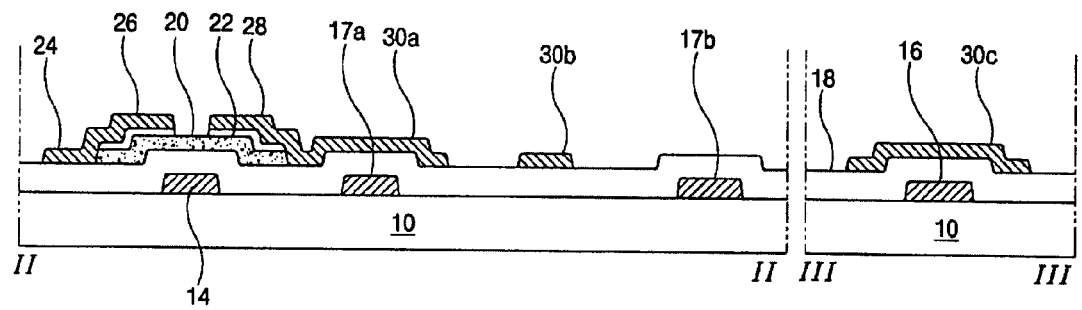
Figure 2C:
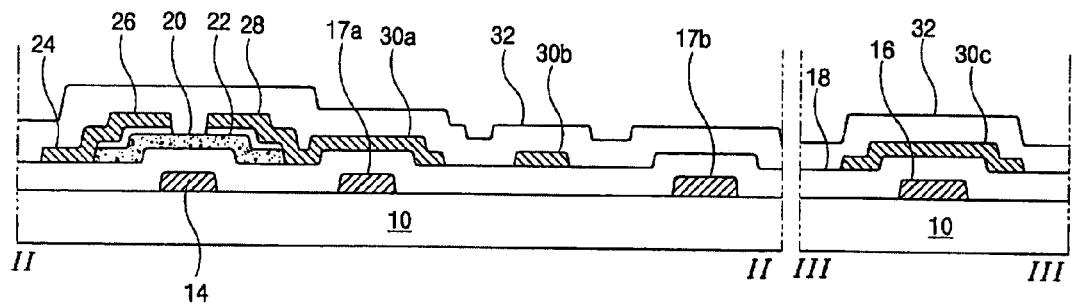
Figure 3:
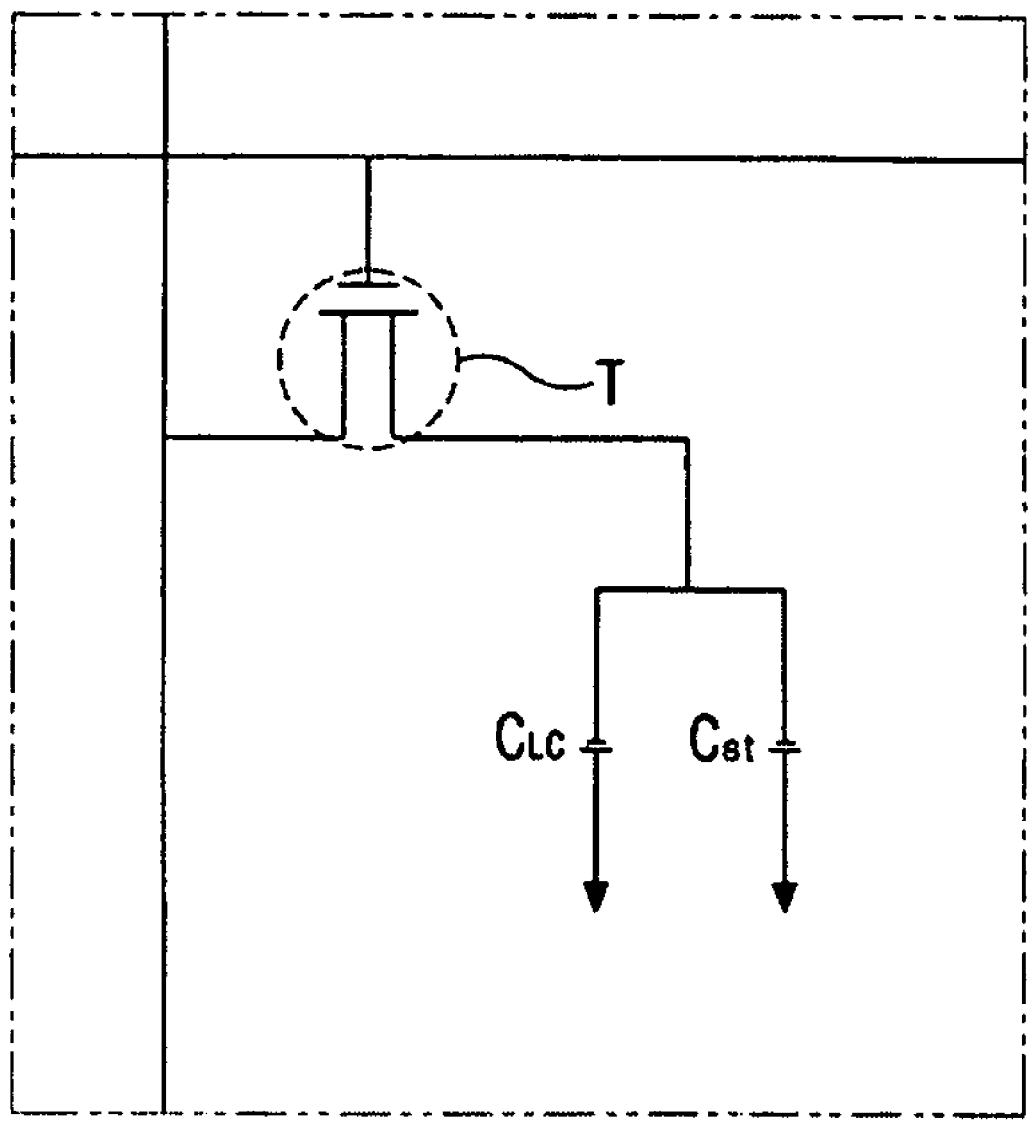
FIG. 3 is a circuit diagram of FIG. 1.
Figure 4:
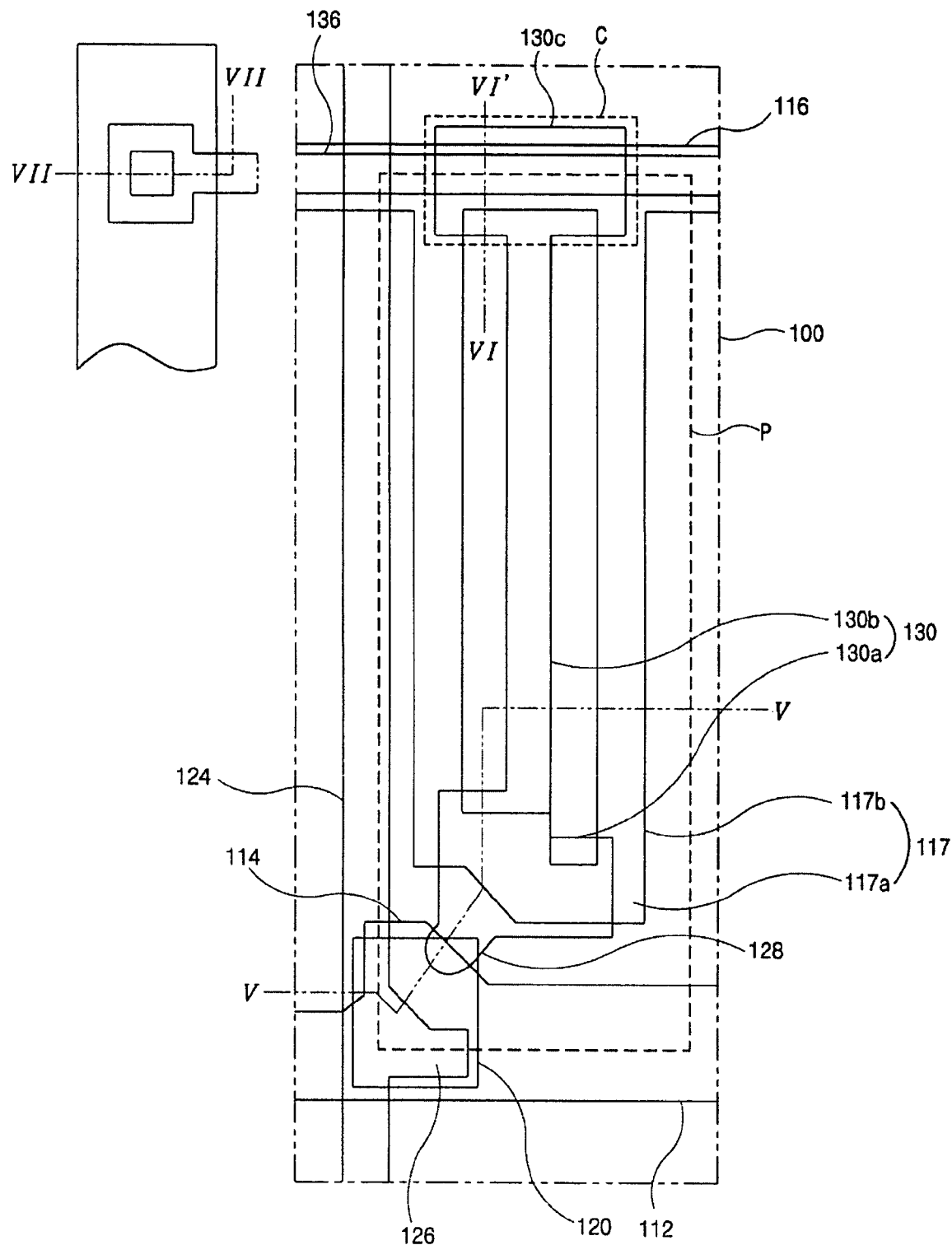
FIG. 4 a plan view of a pixel of an array substrate for an in-plane switching (IPS) mode liquid crystal display (LCD) device according to the present invention.

FIG. 4 a plan view of a pixel of an array substrate for an in-plane switching (IPS) mode liquid crystal display (LCD) device according to the present invention.

As shown in the figure, the array substrate for the in-plane switching (IPS) mode liquid crystal display (LCD) device of the present invention includes a plurality of gate lines 112, a plurality of common lines 116 and a plurality of data lines 124. The gate line 112 and the common line 116 are spaced apart from each other and parallel with each other. The data line 124 vertically crosses the gate line 112 and the common line 116 and defines a pixel region "P" by crossing the gate line 112. A thin film transistor, which includes a gate electrode 114, an active layer 120, a source electrode 126 and a drain electrode 128, is formed in a crossing point of the gate line 112 and the data line 124. The source electrode 126 communicates with the data line 124 and the gate electrode 114 communicates with the gate line 112. A pixel electrode 130 and a common electrode 117 are formed in the pixel region "P". The pixel electrode 130 communicates with the drain electrode 128. The common electrode 117 communicates with the common line 116 and is formed parallel to the pixel electrode 130. The pixel electrode 130 includes an extension portion 130a, a vertical portion 130b and a horizontal portion 130c. The extension portion 130a of the pixel electrode 130 is extended from the drain electrode 128 and the vertical portion 130b of the pixel electrode 130 is vertically extended from the extension portion 130a of the pixel electrode 130. The horizontal portion 130c of the pixel electrode 130 is positioned over the common line 116 and connected to the vertical portion 130b. The common electrode 117 includes a plurality of vertical portions 117b and a horizontal portion 117a. The vertical portions 117b of the common electrode 117 are vertically extended from the common line 116 and arranged in an alternating pattern with the vertical portion 130b of the pixel electrode 130a. The horizontal portion 117a of the common electrode 117 connects the plurality of the vertical portions 117b of the common electrode 117 into one portion. An auxiliary line 136 is further formed over the horizontal portion 130c of the pixel electrode 130 according to the present invention. The auxiliary line 136 is overlapped with the common line 116 and extended to a non-display area of the array substrate in order to electrically communicate with a dummy line 119 (not shown in FIG. 4). The dummy line 119 applies same voltage as the common line 116 to the auxiliary line 136. A dual storage is subsequently formed that includes a first electrode, a second electrode and a third electrode. The common line 116 serves as the first electrode, the horizontal portion 130c of the pixel electrode 130 the second electrode and the auxiliary line 119 the third electrode. With this array structure of the present invention, an area for the storage capacitor "C" can be reduced and enough auxiliary capacitance can be secured.

A fabrication method of the in-plane switching (IPS) mode liquid crystal display (LCD) device according to the present invention will be described hereinafter with reference to FIGS. 5A to 5D.

Figure 5A:
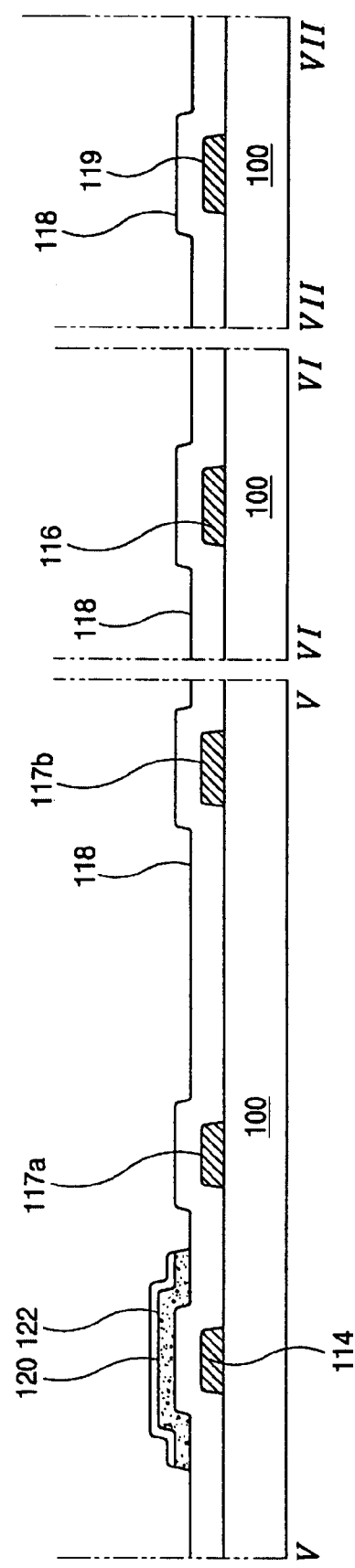
FIGS. 5A to 5D are cross-sectional views taken along V—V, VI—VI and VII—VII of FIG. 4 illustrating a fabrication process according to a fabrication sequence of the present invention.

FIGS. 5A to 5D are cross-sectional views taken along V—V, VI—VI and VII—VII of FIG. 4 illustrating a fabrication process according to a fabrication sequence of the present invention. In FIG. 5A, the gate line 112 (not shown in FIG. 5A) including the gate electrode 114, the common line 116 and the common electrode 117 are formed on a substrate 100 by depositing conductive metal material such as copper (Cu), aluminum (Al), aluminum alloy (Al alloy) like aluminum neodymium (AlNd), chromium (Cr), molybdenum (Mo) or tungsten (W), for example, and then by a first masking process. The common electrode 117 includes the plurality of vertical portions 117b, which is vertically extended from the common line 116, and the horizontal portion 117a, which connects the plurality of the vertical portions 117b into one portion. The dummy line for applying common voltage to the auxiliary line 136 is further formed in the non-display area of the substrate 100. A gate insulating layer 118 is then formed on the substrate 100 by depositing inorganic insulating material such as silicon nitride (SiNx) or silicon oxide (SiO$_2$), for example. An active layer 120 and a ohmic contact layer 122 is subsequently formed on the substrate 100 by depositing and patterning amorphous silicon (a-Si:H) and then doped amorphous silicon (n+a-Si:H or p+a-Si:H).

Figure 5B:
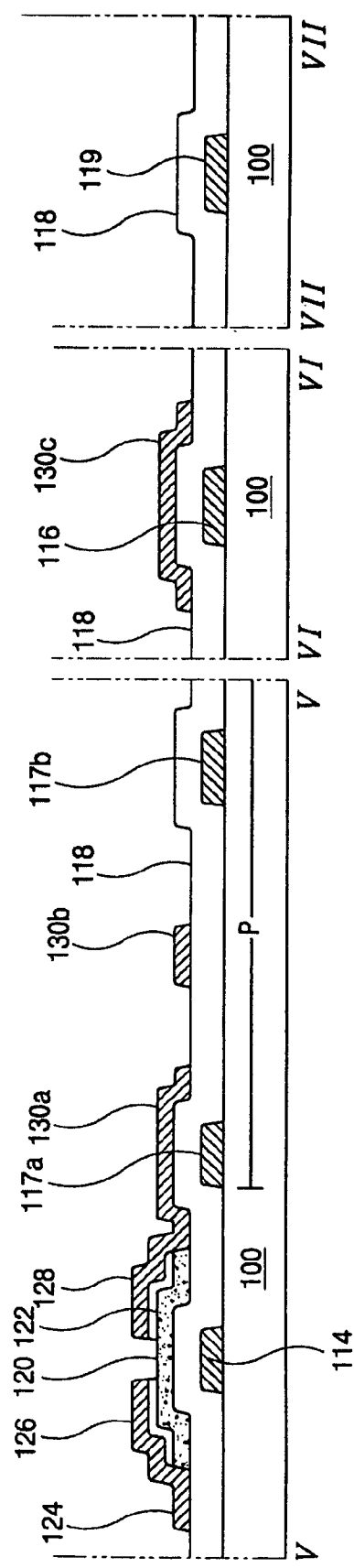

In FIG. 5B, the data line 124, the source electrode 126, the drain electrode 128 and the pixel electrode 130 are formed on the substrate 100 by depositing and patterning conductive metal material such as copper (Cu), aluminum (Al), aluminum alloy (Al alloy) like aluminum neodymium (AlNd), chromium (Cr), molybdenum (Mo) or tungsten (W), for example. The data line 124 crosses the gate line 112 and the common line 116, and defines a pixel region "P" by crossing the gate line 112. The source electrode 126 is extended from the data line 124 and overlapped with a part of the active layer 120. The drain electrode 128 is spaced apart from the source electrode 126 on the active layer 120. As stated above, the pixel electrode 130 includes the extension portion 130a, the vertical portion 130b and the horizontal portion 130c. The horizontal portion 130c of the pixel electrode 130 is formed over the common line 116. A portion of the active layer 120 between the source electrode 126 and the drain electrode 128 is exposed by etching a portion of the ohmic contact layer 122 between the source electrode 126 and the drain electrode 128.

Figure 5C:
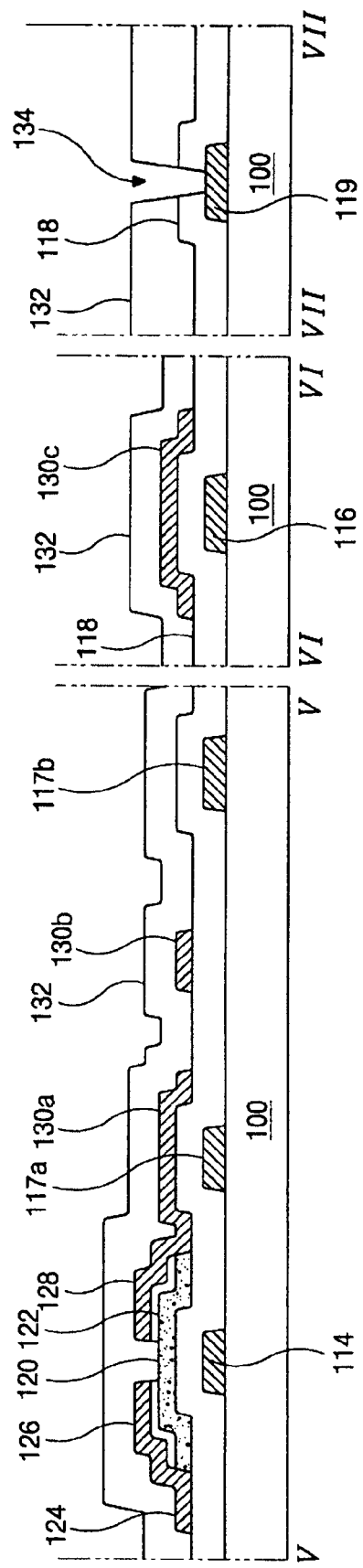

In FIG. 5C, a passivation layer 132 is formed on the substrate 100 by depositing inorganic insulating material such as silicon nitride (SiNx) or silicon oxide (SiO$_2$), for example. A contact hole 134, which exposes a part of the dummy line 119, is formed by patterning the gate insulating layer 118 and the passivation layer 132.

Figure 5D:
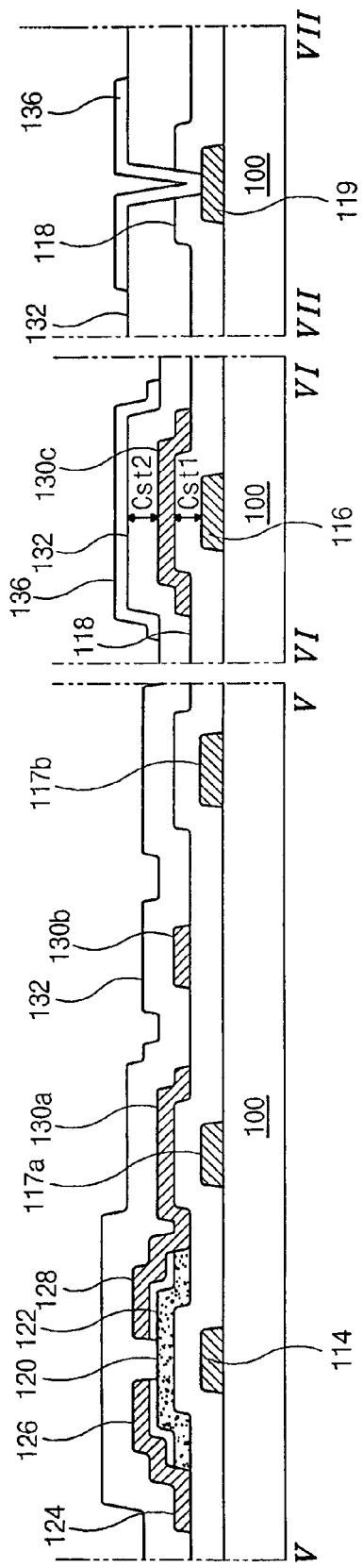

In FIG. 5D, the auxiliary line 136 is formed on the passivation layer 132 by depositing and patterning transparent conductive metal material such as Indium-Tin-Oxide (ITO) or Indium Zinc Oxide (IZO), for example. The auxiliary line 136 is overlapped with the common line 116 and one end of it communicates with the dummy line 119 in the non-display area of the substrate 100. As shown in the figure, dual storage capacitor, which includes a first auxiliary storage capacitor $C_{St1}$ and a second auxiliary storage capacitor $C_{St2}$, are formed under the structure of the array substrate of the present invention. A part of the common line 116 serves as the first electrode, the horizontal portion 130c of the pixel electrode 130 and the auxiliary line 136 the third electrode in the dual storage capacitor.

Figure 6:
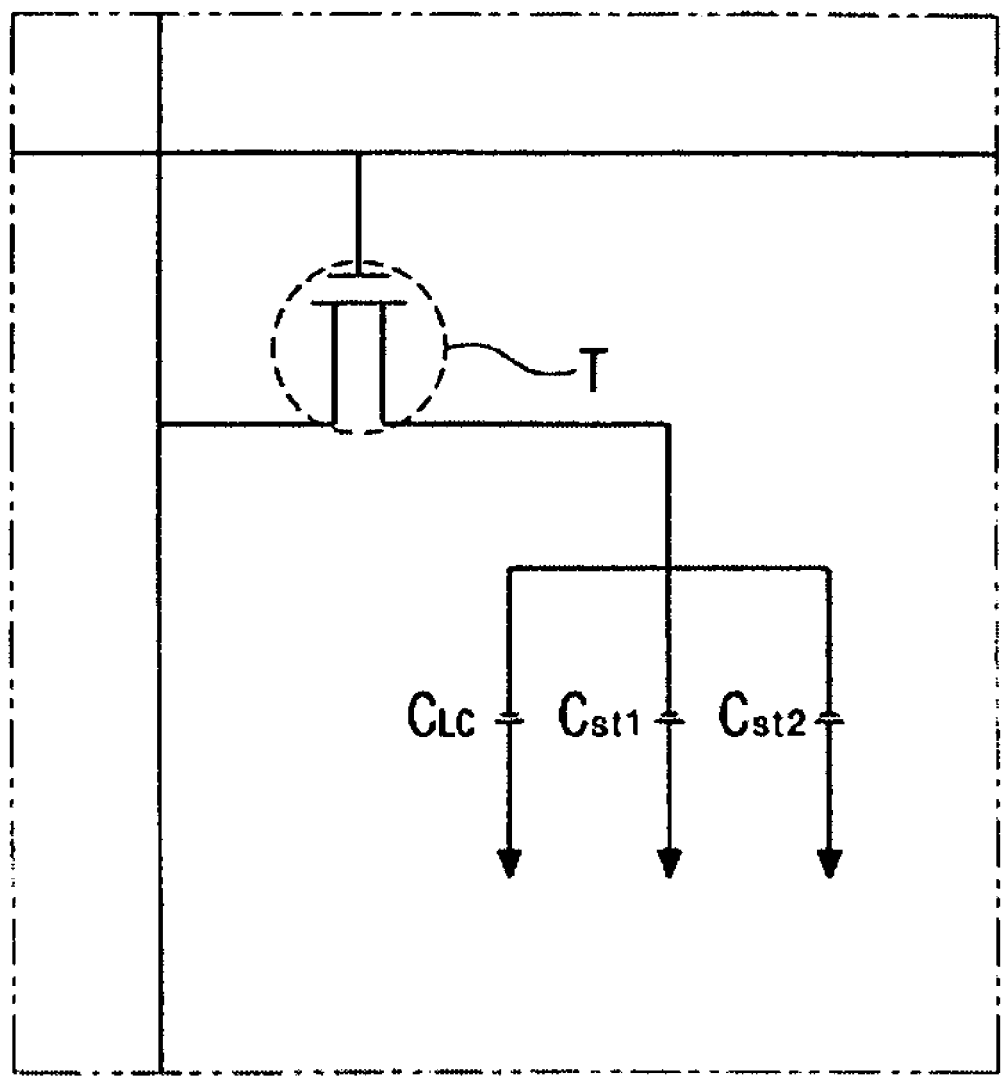
FIG. 6 is a circuit diagram of FIG. 4.

FIG. 6 is a circuit diagram of FIG. 4. In FIG. 6, a liquid crystal capacitor $C_{LC}$ is connected in series to the thin film transistor "T" and the first auxiliary storage capacitor $C_{St1}$, and the second auxiliary storage capacitor $C_{St2}$ are connected in parallel to the liquid crystal capacitor $C_{LC}$. Consequently, enough auxiliary capacitance can be secured even when a width of the common line 116 should be reduced for realizing a minute pixel.

If the pixel structure described in the present invention for the in-plane switching (IPS) mode liquid crystal display (LCD) device that drives a minute pixel, an area for the storage capacitor "C" is not limited. Moreover, if the area for the storage capacitor "C" is designed to be larger in order to secure a capacitance of the storage capacitor "C", an aperture ratio of the liquid crystal panel is not decreased.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. An array substrate for in-plane switching mode liquid crystal display device, comprising:
    a substrate having a plurality of pixel regions;

a gate line, a gate electrode, a common line and a common electrode on the substrate;

a first insulating layer over the substrate;

a semiconductor layer on the first insulating layer;

a data line, source and drain electrodes and a pixel electrode on the substrate including the semiconductor layer, the pixel electrode and the common electrode in each pixel region, the common line and the pixel electrode forming a first storage capacitor;

a second insulating layer over the substrate;

an auxiliary line on the second insulating layer and overlapping the common line, the pixel electrode and the auxiliary line forming a second storage capacitor; and a dummy line in a non-display area of the substrate, wherein the dummy line is connected to the auxiliary line.

2. The array substrate according to claim 1, wherein the dummy line includes one of aluminum (Al), aluminum alloy (Al alloy), tungsten (W), molybdenum (Mo), copper (Cu) and chromium (Cr).

3. The array substrate according to claim 1, wherein the auxiliary line includes one of Indium-Tin-Oxide (ITO) and Indium Zinc Oxide (IZO).

4. The array substrate according to claim 1, wherein the gate line, the common line and the common electrode are formed using the same material on a same layer.

5. The array substrate according to claim 1, wherein the gate line, the common line and the common electrode include one of aluminum (Al), aluminum alloy (Al alloy), tungsten (W), molybdenum (Mo), copper (Cu) and chromium (Cr).

6. The array substrate according to claim 1, wherein the first an insulating layer is between the common line and the pixel electrode to form the first auxiliary storage capacitor.

7. The array substrate according to claim 6, wherein the first insulating layer includes one of silicon nitride (SiNx) and silicon oxide (SiO$_2$).

8. The array substrate according to claim 1, wherein the second insulating layer is between the pixel electrode and the auxiliary line to form the second storage capacitor.

9. The array substrate according to claim 8, wherein the second insulating layer includes one of silicon nitride (SiNx) and silicon oxide (SiO$_2$).

10. The array substrate according to claim 1, wherein a thin film transistor includes the gate electrode, the semiconductor layer, the source electrode and the drain electrode.

* * * * *